United States Patent
Gregory

(10) Patent No.: US 10,400,741 B2
(45) Date of Patent: Sep. 3, 2019

(54) DYNAMIC TURNING OF WAVE ENERGY CONVERTERS USING INERTIAL TRAPS

(71) Applicant: Bruce Gregory, London (GB)

(72) Inventor: Bruce Gregory, London (GB)

( * ) Notice: Subject to any disclaimer, the term of this patent is extended or adjusted under 35 U.S.C. 154(b) by 82 days.

(21) Appl. No.: 15/110,757

(22) PCT Filed: Feb. 3, 2015

(86) PCT No.: PCT/EP2015/025002
§ 371 (c)(1),
(2) Date: Jul. 11, 2016

(87) PCT Pub. No.: WO2015/113777
PCT Pub. Date: Aug. 6, 2015

(65) Prior Publication Data
US 2016/0333847 A1    Nov. 17, 2016

(30) Foreign Application Priority Data

Feb. 3, 2014   (GB) .................................. 1401820.4

(51) Int. Cl.
*F03B 13/20* (2006.01)
*F03B 13/18* (2006.01)
*F03B 15/00* (2006.01)

(52) U.S. Cl.
CPC ............ *F03B 13/20* (2013.01); *F03B 13/188* (2013.01); *F03B 13/1885* (2013.01); *F03B 15/00* (2013.01); *F05B 2240/97* (2013.01); *F05B 2280/5001* (2013.01); *Y02E 10/38* (2013.01)

(58) Field of Classification Search
CPC .......... F03B 13/20; F03B 15/00; F03B 13/24; F03B 13/22; F03B 13/16; B63B 22/00
See application file for complete search history.

(56) References Cited

U.S. PATENT DOCUMENTS

| | | | |
|---|---|---|---|
| 4,773,221 A | 9/1988 | Noren | |
| 5,411,377 A * | 5/1995 | Houser | F03B 13/1855 417/333 |
| 5,872,406 A * | 2/1999 | Ullman | F03B 13/26 290/42 |
| 6,647,716 B2 * | 11/2003 | Boyd | F03B 13/1815 60/398 |
| 6,956,299 B2 * | 10/2005 | Serrano Molina | F03B 13/16 290/42 |
| 7,327,049 B2 * | 2/2008 | Hamburg | F03B 13/1855 290/42 |
| 7,476,137 B2 | 1/2009 | Stewart et al. | |
| 7,726,123 B2 | 6/2010 | Fraser | |
| 8,308,449 B2 * | 11/2012 | Smith | F03B 13/187 137/243 |
| 8,441,139 B2 * | 5/2013 | Karimi | F03D 9/007 290/53 |
| 8,581,432 B2 | 11/2013 | Rohrer | |
| 8,628,303 B2 * | 1/2014 | Smith | F03B 13/187 417/331 |
| 8,912,677 B2 * | 12/2014 | Dehlsen | E02B 9/08 290/53 |
| 9,074,577 B2 * | 7/2015 | Dehlsen | F03B 13/18 |

(Continued)

*Primary Examiner* — Mark A Laurenzi
*Assistant Examiner* — Shafiq Mian

(57) ABSTRACT

A wave energy converter can be dynamically tuned to achieve resonance with ocean swell by varying the geometry of an attached submerged water-filled vessel (41).

8 Claims, 12 Drawing Sheets

(56) References Cited

U.S. PATENT DOCUMENTS

| | | |
|---|---|---|
| 9,631,599 B2 * | 4/2017 | Tuokkola ................ F03B 13/16 |
| 2010/0034588 A1 | 2/2010 | Dick |
| 2010/0171312 A1 | 7/2010 | Burns |
| 2014/0117671 A1 | 5/2014 | Gregory |

* cited by examiner

DYNAMIC TURNING OF WAVE ENERGY CONVERTERS USING INERTIAL TRAPS

FIELD OF INVENTION

Conversion of oceanic wave energy to useful power.

BACKGROUND

Aims

The aims of the present invention are to:
1. Increase the efficiency of wave energy conversion by dynamically tuning an oscillating buoyant body immersed in the ocean to achieve resonance with energetic ocean swell over the range of periods that characterize such swell.
2. Reduce risk of damage in severe sea states by dynamically tuning an oscillating buoyant body to reduce resonance with ocean swell.
3. Achieve the required dynamic tuning by varying continuously and rapidly the inertial mass of the buoyant body.
4. Vary the inertial mass of the buoyant body without major energy consumption, as required, for example, when pumping water out of a flooded buoyant body.
5. Vary the inertial mass of the buoyant body without incurring significant drag losses.
6. Vary the inertial mass of the buoyant body without incurring a fixed overhead of added mass sufficiently large to make wide-range tuning difficult.

Dynamic Tuning

Dynamic tuning means here the continuous real-time control of the period of oscillation of a buoyant body so that this period matches the varying period of the dominant energetic ocean swell.

Ocean swell is generated by mid-ocean storms, and as the swell propagates, the longer period components travel faster, so that successive swell trains are formed with successively shorter periods. In a simplified example, a mid-Atlantic storm instantly propagates swell to the Irish coast over a distance of 2000 km. A swell train of 20 seconds period travels at 56 kph, arriving at the coast after 36 hours. A swell train of 10 seconds period arrives after 72 hours. In this case, the average tuning speed required is 10/36=0.3 seconds per hour. In practice, swell is not instantly propagated but requires persistent high winds over large areas of ocean for a sufficiently high sea to develop. The swell energy per meter of wave front varies with the square of the swell height and with the speed of the swell, which in turn varies with the period. The most intense and persistent storms generate the highest swell with the longest period: usually not more than 25 seconds.

The scale of a storm, its duration and its distance can all vary, so that the average required tuning rate can be as high as 1 second per hour. Faster tuning can be required when the short period swells of a fading storm are succeeded by the long period swells of a new storm. For example, a 10 second swell may be succeeded by a 20 second swell in less than three hours, implying a tuning rate of over 3 seconds per hour. But the fraction of the year during which swell of 20 seconds or more occurs is typically small and the fraction of time over which rapid upward change in swell period occurs is also small. It may therefore not be economic to engineer a wave energy converter (WEC) to be tunable at this extreme rate.

The maximum design rate of tuning of a WEC depends on the balance of gain and cost. The gain is incrementally improved energy transfer. The cost depends on the method of tuning. For example, if the tuning method involves pumping water in and out of the buoyant body, then there are significant associated capital, operating and maintenance costs. The present invention describes a tuning method that enables precise tuning at rates of up to several seconds per hour at costs substantially lower than required for tuning by pumping.

Tuning Range

In general, at a given location, swells of different periods will arrive from different directions from storms at different distances. Swells of greater than 10 seconds period can travel thousands of km in deep water with only slight frictional attenuation, although all swells are subject to reducing wave height as the wave front spreads. Swells with shorter periods attenuate more rapidly. Swells pass through each other, so that in general it is possible to identify a dominant swell and tune a buoyant body to the dominant swell. Tuning can be assisted if the direction of oscillation of the buoyant body can be oriented to the dominant swell.

The frequency distribution of ocean swell energy peaks at 6-8 seconds period in the absence of significant storms, rising to around 13-15 seconds period for major oceanic storms, involving winds over 50 kph over thousands of square kilometers of ocean, acting over several days. Analysis of over 140,000 measurements over six years at ten widely separated locations across the North Atlantic showed that swells with periods exceeding 15 seconds occur less than 0.4% of the time. Swells with periods under 5 seconds occur 25% of the time in mid-Atlantic but on the west coast of Ireland and Scotland occur, as a result of attenuation, only 6% of the time. Because swell energy varies with swell period, the proportion of total annual swell energy below 5 seconds period in the latter locations is only a few %. To capture most of the available annual swell energy requires a dynamic tuning range between 5 and 15 seconds ie a 3× variation in period. This is referred to as wide-range dynamic tuning. Depending on the typical sea states at the location of the buoyant body the required range could be, for example, 6 to 18 seconds or 7 to 21 seconds. A 3× variation in period can be achieved with a 9× variation in total mass moment of inertia. The present invention describes how to achieve a sufficiently large variation in inertial mass to achieve a 3× variation in period.

Wave Energy Conversion Efficiency

A WEC converts wave motion to the motion of a buoyant body (usually floating on the water surface but sometimes buoyant and submerged) and uses the relative motion of the floating body and a reference body to move a conductor through a magnetic field, so generating an electric current. The electrical generator can be in situ or remote (for example, the WEC pumps water to a shore station to drive a turbine). The reference body can be a fixed platform such as a wind turbine plinth, or a pseudo-stationary body that has large inertial mass, or a second floating body that is arranged to be out of phase, or an inertial device. In the case of an oscillating water column WEC, the relative motion is between a trapped column of water and the enclosing structure. There can be many inefficiencies in this process. One of the largest sources of inefficiency is a mismatch between the natural frequency of oscillation of the buoyant body and the frequency of the impinging wave. Where the sea state is effectively random, this is unavoidable. However, in many locations on the edges of large oceans, for example, off the west coast of Scotland, there are predictable energetic swells. In such locations, a common strategy is to design the WEC with a single natural frequency that matches the average annual local peak energy frequency or to design the WEC with slow tuning over a limited range of frequencies, for example, using variable ballast to match seasonal sea states. However, this is a poor substitute for wide-range dynamic tuning.

Varying the Inertial Mass

It is possible to tune an oscillating floating body by pumping water in and out of it. But significant amounts of energy and time can be required to pump the water. Also pumped-in water displaces air, so changing the displacement and balance of the floating body. An alternative is to contain water in one or more submerged vessels that are attached to an oscillating floating body. When the vessel is open in the direction of oscillation—for example, the vessel is a cylinder that is open at both ends—the contained water is not 'trapped' and has no significant inertial effect. When such a cylinder is closed at both ends, the contained water is 'trapped' and it has an inertial effect and so varies the period of oscillation of the floating body. There is no pumping. The vessel can be opened and closed rapidly: for example, in a few seconds. In this manner, the period of oscillation of the buoyant body can be changed rapidly. This method is called 'inertial trapping.'

Provided the open and closed vessels are streamlined and have a fineness ratio exceeding around three, there is negligible added mass and energy losses due to drag and friction are small. If the vessel geometry is varied so that the fineness ratio falls below three, then the added mass rises. When the fineness ratio equals one, the streamlined vessel is spherical and the added mass is around 50% of the mass of the contained water. This can be useful in that the variability of total mass (ie mass plus added mass, sometimes called virtual mass) is increased and so the range of tuning is extended. The drawback is that drag is also increased. The design decision on the minimum allowed fineness ratio depends on a balance between the advantages of wider and faster tuning and the disadvantage of drag losses. Across most of the range of variation in vessel geometry it is preferable to have minimal drag losses ie a vessel should preferably have a smooth lenticular cross-section in the oscillating vector. Such a lenticular profile also incurs very little added mass. Low added mass at low volumes of contained water assists the variability in total mass ie the tuning range.

Gregory in GB1218866.0 describes tuning of a heaving floating body by such inertial trapping. Attached to a heaving floating body is a plurality of 'inertial traps', comprising submerged vertical tubes of different volumes. By opening and closing these tubes in different combinations, it is possible to trap different inertial masses of water, for example, varying the total amount trapped nine-fold. Provided the fixed overhead of mass and added mass is kept low, variation in the mass of contained water is sufficient to enable wide range dynamic tuning. But these traps have deficiencies:

The traps are kept streamlined at all stages of operation, in an example, by using spindle-shaped plugs to open and close the tubes. But such plugs have a fixed mass that reduces the available range of variation in total mass.

The tuning is in incremental steps and the increments can be reduced only by increasing the number of traps.

Multiple traps are required.

The present invention solves these problems, with traps that:

Can be opened and closed without significant additional fixed mass and with streamlining maintained.

Permit continuous fine variation in trapped volume.

Enable a single trap to assist dynamic tuning of a floating body.

Other Prior Art

Noren in U.S. Pat. No. 4,773,221 describes a wave energy converter that captures the relative motion of a buoyant body and a submerged, vertical, open-ended tube. The buoyant body is connected to a piston that slides inside the tube. Tuning is not claimed. Lack of streamlining means that fixed added mass and drag losses are significant.

Dick in US 20100034588 describes a WEC comprising a surface-piercing float linked by a power take off to a streamlined submerged body having an entrapped volume of seawater. The difference in the oscillation frequency of the float and the submerged body enables power capture. The submerged body includes at least one cylindrical compartment that can be opened or closed at either end to trap or release water. The deficiencies of this design are:

The described trapping of water does not tune the float to resonate with the dominant swell, so improving energy capture. Instead it 'detunes' a submerged body against which the float reacts.

The submerged body 'includes' a compartment 'sealed off from the remaining portion of the body' ie the submerged body has a significant fixed inertial mass, so that tuning is limited to a narrow range.

The compartment for trapping water is a cylinder of fixed dimensions. Tuning using variable geometry is not described.

The means of closing the compartment is not specified to ensure streamlining, so that the added mass can significantly affect tuning and drag losses can be substantial.

Fraser et al in U.S. Pat. No. 7,726,123 describes a WEC comprising a floating vessel with an array of vertical chambers extending to different depths so as to provide a range of resonant frequencies of the air columns above the water level. These air columns drive a turbine. The inertia of the entrained water affects the resonant frequency but the chambers have fixed geometries and so fine tuning is not possible.

Stewart et al in US2007/0046027 describes a WEC with flexible or telescoping floats that can be inflated. The purpose is not to tune the floats but to deploy them.

Burns in US20100171312 describes a WEC using a buoyant actuator with a pliant outer skin and a mix of solid and fluid contents that jointly allow variation in buoyancy and response area. This differs from the present invention, which describes a non-buoyant device that contains only a variable volume of water, that is always streamlined in the direction of oscillation and that varies the inertial mass only.

Rohrer in US 2010/0308590 describes a WEC using variable geometry containers but these are for capturing motion, are not used in tuning and are not streamlined in the direction of oscillation. Rohrer references several other similar designs.

SUMMARY OF INVENTION

A submerged vessel of substantially neutral buoyancy is rigidly attached to the oscillating buoyant body of a wave energy converter and is arranged to trap or release a volume of water, whereby the oscillation period of the buoyant body can be varied. This is an inertial trap.

In an example, an inertial trap is opened and closed using side-by-side pairs of straight high tensile metal strips, connected to each other by a hinge at each end of the strips. Such hinged strips are routinely used as a closure for purses and are called flex-frames. A flex-frame is embedded in the circumference of the end of a cylinder constructed of pliant material. When the ends of the pairs of strips are pushed inwards, the strips flex apart, opening the end of the cylinder. When the inward pressure is removed, the strips tend to snap back to a side-by-side position, closing the end of the cylinder. By using two flex-frames, with one embedded in the walls of each end of the cylinder and by orienting the two flex-frames at right angles to each other, an intrinsically stiff tetrahedral geometry results. The tetrahedral shape is streamlined in the direction of the axis of the cylinder at all stages of opening and closing. The simplicity of the tetrahedral trap enables low-cost construction.

A continuously variable capacity inertial trap is defined here as an inertial trap that has a continuously variable geometry, whereby the trapped volume of water can be continuously varied and so the oscillation period of the buoyant body can be continuously varied. Water must be moved into or out of the vessel but this movement of water is against a small pressure difference and so the energy required is small.

A continuously variable capacity inertial trap can be constructed using:

1. One or more elastic membranes. An elastic material is defined to be material that can be stretched or compressed and, on removing an applied force, resumes its original shape. As an example, the trap is a spherical balloon made of an elastic membrane that can be inflated with water or deflated. As an example, the elastic material is neoprene.
2. Flexible members. A flexible material is defined to be a material that is capable of repeated bending without damage. As an example, the trap is a pair of flexible planar sheets held face to face. The side edges of the sheets are joined by elastic gussets. When top and bottom edges of the sheets are pushed towards each other, the sheets flex away from each other, creating an increasing volume between the sheets. As an example, the flexible material is fibre-reinforced plastic. As another example, the flexible material is high tensile steel coated with rubber.
3. Sliding elements. As an example, a cylinder is constructed of sliding telescopic segments. When the segments are separated or drawn together, the volume contained inside the cylinder increases and decreases respectively. As an example, the sliding material is steel.
4. Pleats, where a pleat is a fold made by doubling an area of material upon itself. As an example, a cylinder is made of elastic material and the cylinder wall is formed into longitudinal pleats. Alternatively a cylinder has longitudinal pleats constructed of hinged flaps. The pleats can be opened out, so increasing the volume of the cylinder.

These methods can be combined. For example, an elastic balloon can be reinforced by an inner array of equally spaced flexible spars. When the ends of the spars are brought together, the spars bow outwards.

Examples equivalent to inertial trapping can be found in nature, although not associated with the purpose of dynamic tuning.

One example is the puffer fish, which ingests water rapidly, inflating its body from a spindle shape to a spherical shape and so resisting ingestion by a predator. The puffer fish expands its stomach up to 100× in volume and is able to do this because the stomach is densely pleated, having pleats within pleats. At the same time the fish remains streamlined at all times because its outer skin has two layers: an inner, fibrous pleated layer and a smooth and elastic outer layer. An inertial trap with similar design combines a pleated wall with a smooth elastic outer skin.

Another example is the rorqual whale, named for the furrows along the throat. The rorqual family includes the blue whale, which can ingest up to 100 tons of water in a few seconds, engulfing shoals of small crustaceans or fish. The rorqual whale lunges forwards and then opens its mouth. The circumference of the whale's throat stretches up to four-fold under ram pressure, more than doubling the total volume of the whale. This expansion is enabled by the composite, pleated structure of the throat in which up to 120 tough parallel bands are linked by highly elastic folds. The pleats in the throat are aligned with the direction of travel of the whale, so that the whale remains streamlined at all times. An inertial trap with similar design combines reinforcing bands, made of tough, flexible material, with elastic pleats.

The trap can be integrated into the structure of the buoyant body. For example, the top of a telescopic cylinder can be joined to the bottom of a buoyant body.

Because such a trap is submerged and operates with neutral buoyancy, it can be arranged to avoid high stresses and so can be inexpensively constructed.

To reduce energy losses, the trap should be streamlined in the direction of oscillation. For example, if the trap is used in a heaving WEC, then the trap should be streamlined in the vertical direction, both upward and downward. The trap should be effectively streamlined at all phases of operation ie at all possible contained volumes, open or closed.

Also to reduce energy losses, the trap should be sufficiently rigid at all phases of operation so that the trap does not undulate significantly and the water contained does not form significant waves within the trap. For example, where the trap is formed from elastic material, it should preferably be stretched over a frame so that the trap is sufficiently rigid at low levels, or at zero, inflation.

An inertial trap that is held near the ocean surface will be captured by the subsea orbital motion of swell. This could be intentional, in which case, the trap must be built to handle significant stresses. But, for example, a trap mounted below a heaving WEC should be well below the surface, preferably at least 20 m below, so that the heaving performance of the WEC is not compromised. A deeply submerged trap, operating with neutral buoyancy, avoids high stresses, enabling inexpensive construction.

Heaving Inertial Trap

A tunable WEC using heaving motion can employ an inertial trap constructed as follows:

1. A vertical cylinder of flexible material has a flex-frame embedded in each end. The ends can be opened and closed. By arranging the flex-frames to be at right-angles to each other, the closed cylinder is a stiff tetrahedron.
2. A vertical cylinder of elastic material has pinched ends that are aligned with each other. The middle section of the cylinder is reinforced with a flexible and resilient interior cylinder. The middle section can be flattened or expanded. This can be described as a 'pillow' geometry.
3. A vertical cylinder of elastic material has pinched ends that are aligned with each other. The interior of the cylinder contains a horizontally pleated cylinder. The interior cylinder can be expanded and contracted, with the outer elastic skin maintaining a smooth surface. This can be described as a 'puffer fish' geometry.
4. A vertical bundle of identical flexible strips are hinged at each end to upper and lower rings so that when the rings are pushed together, the strips bow outwards forming a vertical spindle shape. The strips are linked by elastic pleats. This can be described as 'rorqual' geometry.
5. A pair of flexible smooth vertical sheets are hinged together at top and bottom. When the hinged edges are pushed together, the sheets bow to form a lenticular profile. A bowed flexible strip is fixed to each open side of the two sheets. Elastic sheet connects the flexible sheets and the flexible strips so that the volume between the sheets is completely enclosed.
6. A vessel with vertical lenticular profile, constructed as a scroll of flexible curved sheet that can be wound and unwound.
7. A streamlined vertical cylinder, comprising telescoping sections or constructed from a telescoping spiral strip ie in the form of the familiar sticky fly trap.
8. A telescoping vessel with bilaterally symmetrical telescoping segments, all with a vertical lenticular profile.
9. A telescoping vessel with segments of vertical lenticular profile hinged on a vertical axis, these segments telescoping by rotational movement.
10. A pleated body with bilaterally symmetrical nested pleats, all with a vertical lenticular profile.
11. A pleated body with bilaterally symmetrical nested pleats, all with a vertical lenticular profile, the pleats being reinforced with high tensile wire in a spiral configuration.

Oscillations of the heaving WEC in other vectors, for example, surging or pitching, can be reduced by arranging for a low centre of gravity, by not using an inertial trap with a planar geometry and by locating the main bulk of the inertial trap well below the ocean surface: preferably at least 20 m deep.

Surging Inertial Trap

A mono-directional surging WEC can use the same trap designs as listed above, rotated through 90 degrees.

An omnidirectional surging WEC requires a trap that is preferably streamlined along every horizontal radius, the implied geometry being a streamlined disc. Possible traps include:
1. A reinforced smooth-surfaced, disc-shaped balloon.
2. A hollow rigid elastic disc with a series of parallel circular pleats on each side. The pleats allow the disc to be expanded or contracted.
3. A hollow disc comprising rigid circular faces connected by a folded elastic annulus. The annulus allows the two faces to come together or move apart.
4. A hollow disc comprising telescoping segments.

Pitching Inertial Trap

Variable capacity inertial traps can be used to tune a pitching WEC. As an example, a dynamically tunable WEC that uses pitching motion can be constructed using a floating pitching body with symmetrical fore and aft arms on which are fixed at least two equal variable masses that are symmetrically distant from the pitching centre. Each variable mass can be a variable capacity inertial trap as described above for a heaving floating body.

An omnidirectional pitching WEC can be constructed using a floating pitching body with at least three arms that are radially equally spaced from each other. Fixed to each arm can be a variable capacity inertial trap as described for a heaving floating body, the traps being equidistant from the pitching centre.

Wave-following Inertial Trap

Variable capacity inertial traps can be used to tune a wave-following WEC. As an example, a series of dynamically tuned heaving bodies (see above) is aligned with the dominant swell and adjacent heaving bodies are separated by half a wavelength. As one body floats on the crest of a swell, an adjacent body floats on a trough and vice versa. Adjacent bodies are connected in an arrangement that captures the differential orbital motion of these bodies. Effective tuning requires that the connecting arrangement allows dynamic adjustment in the length of connection to match variation in wavelength.

Gregory in GB1218866.0 describes a wave-following WEC that achieves dynamic variation in length by locking and unlocking floating segments. Dynamic variation in length can also be achieved by other means, including telescoping sections or use of a scissor arrangement of rigid beams or use of cables controlled by locking winches. In the last case, power can be extracted using a piston chamber mounted on each of the connecting cables. Springs can be mounted in the chambers to provide the return stroke. Where the length of cable between adjacent bodies is controlled to be half the wavelength of the dominant swell, then the orbital motion of adjacent bodies will be in exact counter-phase, with maximum extraction of power.

A tunable WEC that uses oscillation in all vectors cannot be fully streamlined. Equal although imperfect streamlining in all directions can be achieved using a spherical trap: for example, a smooth-surfaced, spherical elastic balloon. The traps already described for omnidirectional surging are also applicable.

To enable tuning that is both fast and exact, a fixed capacity inertial trap that has rapid opening and closing can be combined with a variable capacity inertial trap.

Dynamic tuning over a wide range requires that the fixed moment of inertia of mass and the fixed moment of inertia of added mass of the WEC are both kept low. As described by Gregory in GB1218866.0, this requirement can be met by, for example, using light-weight materials and methods of construction, by keeping moving parts of the WEC out of the water and by streamlining moving parts of the WEC that are immersed.

For example, where a wave-following WEC is constructed using a series of closely coupled floating bodies, these should preferably be made of light-weight materials with V-shaped hulls.

Water Inlets/Outlets

A variable capacity inertial trap requires ports to allow water to move in and out. In some cases, the ports can be opened and closed at will. In other cases, the ports remain permanently open. Ports should be sufficiently numerous and/or large to present little resistance to flow and to avoid blockage due to floating detritus. At the same time, the ports should not significantly reduce the inertial trapping effect or create drag losses. Experiments show that, in the case of a heaving trap, small permanently open ports in the midsection of the trap have no discernible effect on either inertia or drag. However, small permanently open ports at each end of the trap, aligned with the direction of oscillation, reduce inertia and increase drag. This is because such pairs of ports create a turbulent flow path through the trap.

To avoid entry of detritus into the trap, the ports can be screened with mesh.

In the instances described here, the intake and expulsion of water is achieved directly by changes in vessel geometry. As an alternative, one or more reversible pumps can be used to drive water in and out of the vessel, inflating and deflating the vessel respectively. In this case, the port or ports must allow controlled opening and closing.

Scope and Ramifications

The instances of invention described here are embodiments of a system for dynamically tuning a WEC by varying a trapped volume of water using a variable geometry. It is not intended to limit the invention to these specific instances, nor to limit the invention to tuning the oscillation of a floating, surface-piercing body: the same methods can be applied to a buoyant body that is submerged.

BRIEF DESCRIPTION OF FIGURES

The figures are schematic and not to scale.

DETAILED DESCRIPTION OF FIGURES

Figure 1A:
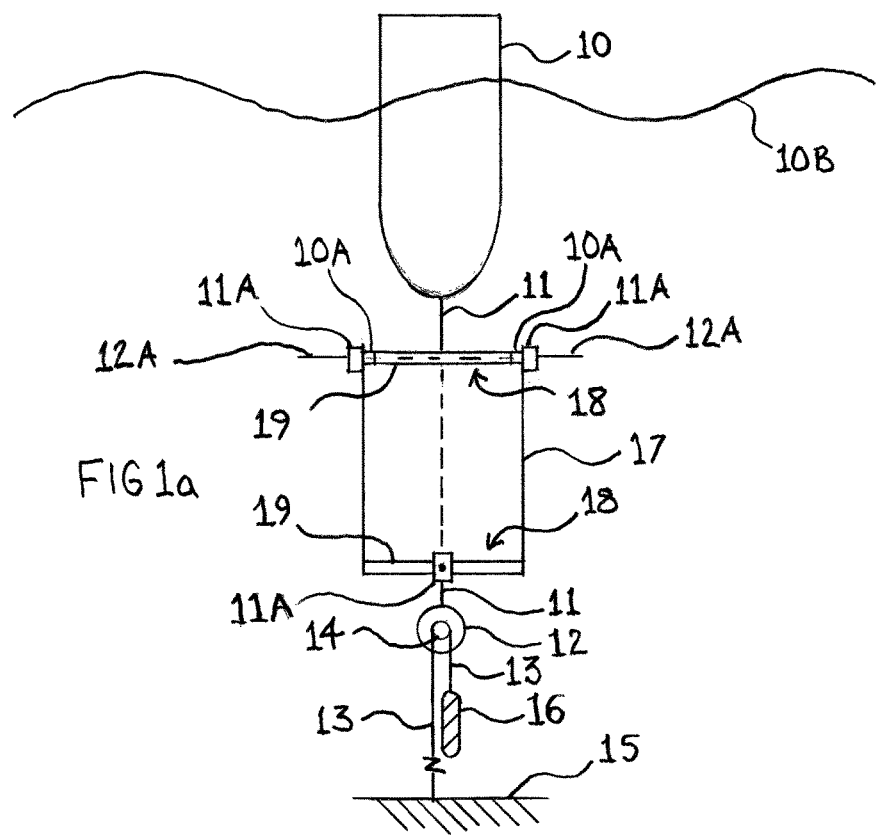
FIG. 1a: side view: heaving WEC with open tetrahedral inertial trap.

FIG. 1a: side view: heaving WEC with open tetrahedral inertial trap.

A heaving WEC comprises a floating body (10) with a rigid vertical spar (11) rigidly attached to the underside. The lowest end of the spar (11) bears an oscillating shaft generator (12). A cable (13) runs over the shaft (14) of the generator (12). One end of the cable (13) is attached to the seabed (15). The other end of the cable (13) is attached to a counterweight (16). As the floating body (10) oscillates due to the action of swell (10B), the cable (13) oscillates over the shaft (14) driving a combination of gear train, clutches, flywheel and rotary electric generator (not shown). The power take off shown is an example and other power take off arrangements are possible. The spar (11) passes through the axis of an open-ended vertical cylinder (17) made of flexible, sea-water resistant material such as nylon-reinforced neoprene.

Embedded in the circumferential edges of each end of the cylinder (17) are flex frames (18). Each flex frame (18) comprises a pair of high tensile flexing strips (19), each having a length that is substantively half the circumference of the cylinder (17). The strips (19) terminate at each end in a hinge (10A) that is rigidly attached to a block (11A) that is streamlined in the direction of oscillation and slidably attached to a rigid cross-bar (12A). The cross-bar (12A) is rigidly attached to the spar (11). The spar (11) and two cross-bars (12A) provide longitudinal rigidity to the cylinder (17). Attached to the inner circumferential edge of the ends of the cylinder (17) are compressible sealing strips (13A). Each block (11A) is arranged to move along the cross-bar (12A) by a linear actuator (not shown), for example, by using an electric motor (not shown) to rotate a threaded element (not shown) about a thread (not shown) on the cross-bar (12A). The cross-bars (12A) and the blocks (11A) are streamlined in the direction of oscillation (this feature not shown).

Figure 1B:
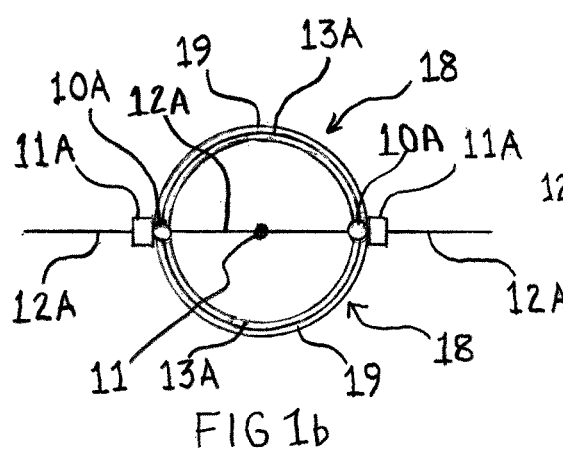
FIG. 1b: plan view: open end of tetrahedral trap with flex frame.

FIG. 1b: plan view: open end of tetrahedral trap with flex frame.

When the blocks (11A) are moved towards the axis of the cylinder (17), the flexing strips (19) bow apart. The blocks (11A) are halted when the strips (19) form a circular opening as shown. In this position, the cylinder (17) is fully open and allows water to flow freely through it. The water in the open cylinder (17) has no significant effect on the total inertial mass of the oscillating floating body (10) and therefore has no effect on the oscillation period. Additionally, the open cylinder (17), aligned with the direction of oscillation, creates negligible added mass and very little drag.

Figure 1C:
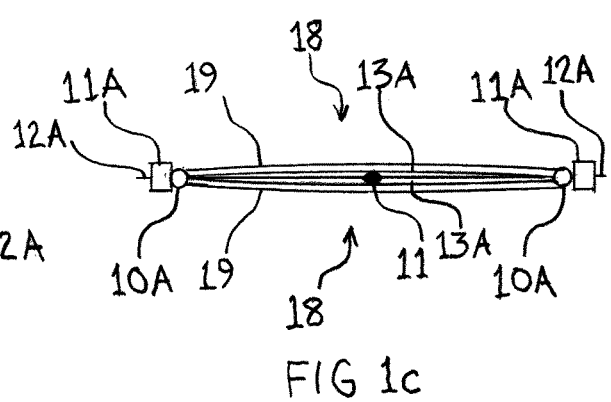
FIG. 1c: plan view: closed end of tetrahedral trap with flex frame.

FIG. 1c: plan view: closed end of tetrahedral trap with flex frame.

The unforced position of the flex frames (18) is with the flexing strips (19) aligned side by side. When the blocks (11A) are moved away from the axis of the cylinder (17), the strips (19) move together, closing the end of the cylinder (17).

By arranging the cross-bars (12A) at each end of the cylinder (17) to be at right angles to each other, the ends of the cylinder (17) when closed create a tetrahedral shape, with inherent rigidity.

When the cylinder (17) is closed at both ends, the inertial mass of the water contained in the trap in the cylinder (17) is added to the inertial mass of the floating body (10: see FIG. 1a), so increasing the period of oscillation. The closed cylinder (17) is streamlined in the direction of oscillation, creating negligible added mass or drag.

The speed of tuning of the floating body (10: see FIG. 1a) varies with the speed of opening and closing the cylinder (17). This in turn depends on the linear actuation power applied to the blocks (11A). The distance moved by each block (11A) from the fully open to the fully closed position is R (0.5π−1)=0.57 R where R is the radius of the cylinder (17). For example, if the cylinder (17) has a radius of 2 m, the distance moved by each block is 1.14 m. Commercially available linear actuators can open and close the cylinder (17) within a few seconds.

The cost of this trap is likely to be modest, being made of standard materials, using standard methods. The starting point is a rectangular sheet of flexible material that can be bent into a cylinder and welded. Water-proof linear actuators are available off the shelf.

The trap described can operate quickly but has a fixed capacity. As an example, it can be used in a small version as a fast fine-tuner, in combination with a larger, slower, variable capacity inertial trap.

Figure 2A:
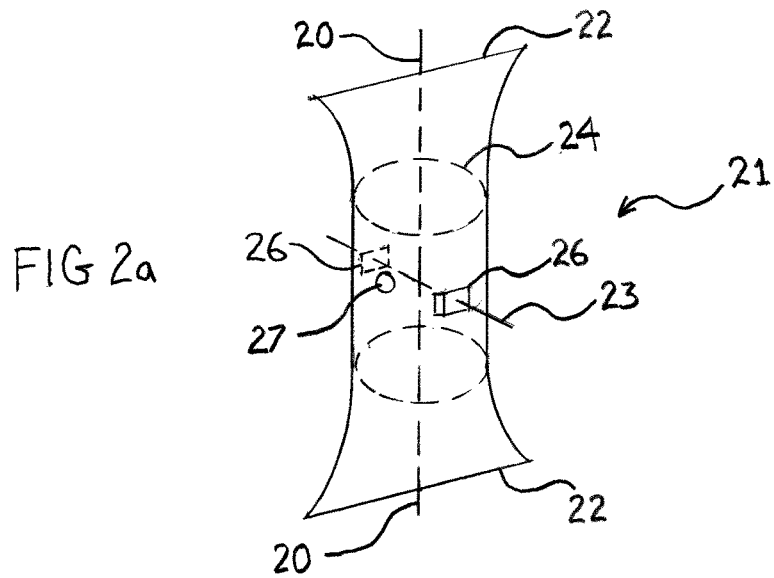
FIG. 2a: 3D view: flexible 'pillow' heaving trap at high volume.

FIG. 2*a*: 3D view: flexible 'pillow' heaving trap at high volume.

Figure 2B:
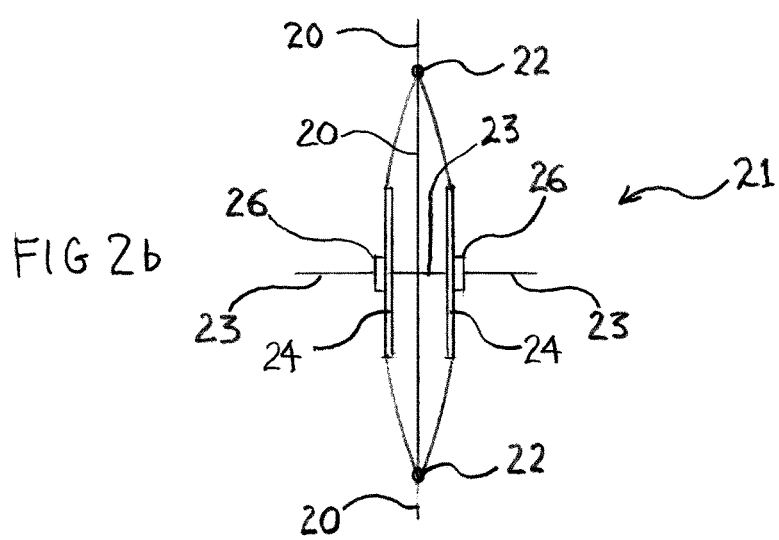
FIG. 2b: side view cross-section: flexible 'pillow' heaving trap at low volume.

FIG. 2*b*: side view cross-section: flexible 'pillow' heaving trap at low volume.

A rigid vertical spar (20) is rigidly attached to a heaving floating body (not shown). The spar (20) passes along the vertical axis of the trap (21) and is rigidly connected at right angles to two end cross-bars (22) and one central cross-bar (23). The two end cross-bars are embedded in the ends of the trap (20). The central cross-bar (23) is at right angles to the two end cross-bars (22). Each arm of the central cross-bar (23) passes through the middle of a cylindrical reinforcing strip (24) and through the wall of the trap (21). The outer skin of the trap (21) is a flexible and pliant material: for example, neoprene reinforced with nylon. The reinforcing strip (24) is embedded in the wall of the trap (21) and is made of a flexible and resilient material: for example, thin rubber-coated high tensile steel. The overall effect of the strip (24) and the two end cross-bars (22) is that the unforced shape of the trap (21) is a cylinder with pinched ends, similar in shape to a pillow.

Slidably attached to each arm of the central cross-bar (23) is a block (26). Each block (26) is attached to the embedded reinforcing strip (24). When the blocks are moved together, opposite sides of the reinforcing strip (24) move closer, the 'pillow' is deflated, as shown in FIG. 2*b*, and the volume inside the trap (20) reduces, so that the period of oscillation of the floating body (not shown) is reduced. The blocks (26) are moved by linear actuators (not shown). Ports (27) in the midsection of the trap (21) allow water to enter or leave the trap (21).

Figure 2C:
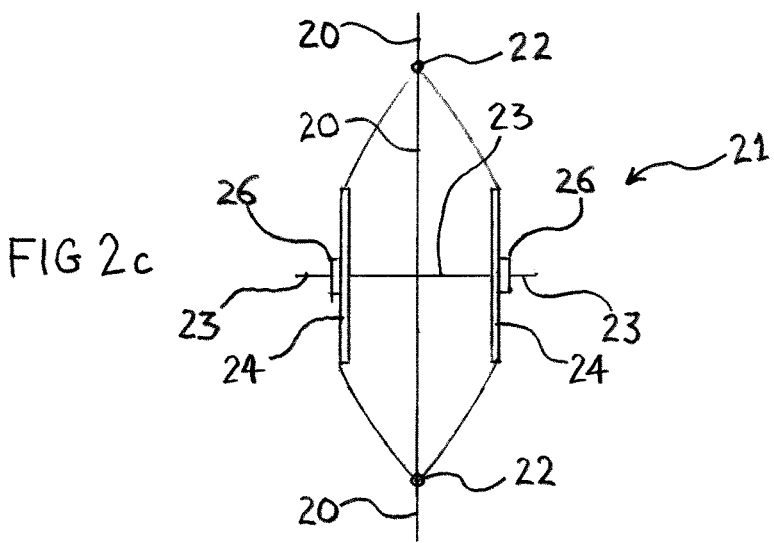
FIG. 2c: side view cross-section: flexible 'pillow' heaving trap at high volume.

FIG. 2*c*: side view cross-section: flexible 'pillow' heaving trap at high volume.

This is the same as FIG. 2*b* except that the trap (21) is operating at high volume. The two blocks (26) have been moved apart and the 'pillow' has been expanded. The volume of water in the trap (21) is increased and so the period of oscillation of the floating body (not shown) is increased.

By varying the separation of the blocks (26), the volume of trapped water can be varied and so the period of oscillation of the floating body can be varied. The trap (21) remains streamlined at all volumes of trapped water, with little associated added mass or drag.

The speed of tuning depends on the power of the linear actuators (not shown) that move the blocks (26). Rapid motion of the blocks (26) would cause turbulence at the ports (27) and therefore energy loss. As an example, a trap (21) has a radius of 2 m. Each block moves 2 m from maximum to minimum volume. Suitable linear actuators can make this adjustment in a few seconds.

Figure 3A:
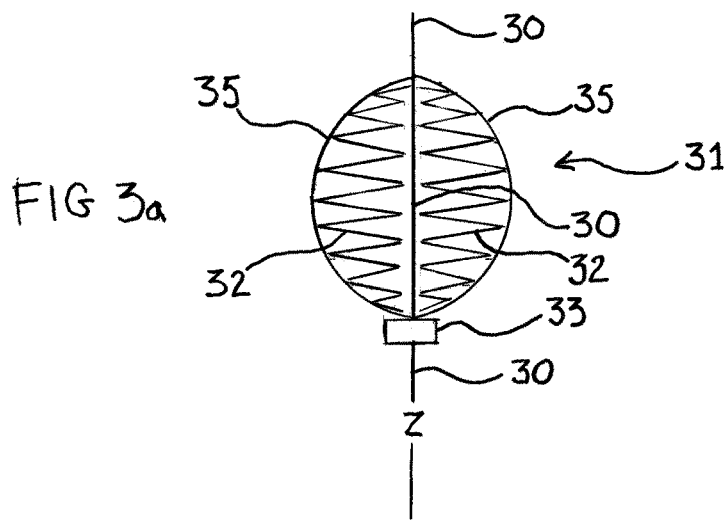
FIG. 3a: side view cross-section: 'puffer' heaving trap at low volume.

FIG. 3*a*: side view cross-section: 'puffer' heaving trap at low volume.

A heaving floating body (not shown) is rigidly attached at the underside to a rigid vertical spar (30) that passes through the axis of a spindle-shaped vessel (31). The vessel (31) is constructed of pliant material with horizontal pleats (32) of graded diameter so that when the pleats (32) are folded each pleat (32) fits inside an adjacent larger pleat (32). The spar (30) is fixed to the top of the vessel (31) and is slidably attached to a lower block (33). The lower block (33) is fixed to the bottom of the vessel (31). Attached to the block (33) is a linear actuator (not shown) that can move the block (33) along the spar (30). A single port (detail not shown) at the bottom of the vessel allows water to enter and exit. By moving the lower block (33) upwards, the pleats (32) in the vessel (31) are folded and the vessel (31) is compressed as shown. In the compressed state the volume of water contained in the vessel is low and the period of oscillation of the floating body is reduced. Surrounding the vessel is an elastic outer skin (35) so that the vessel (31) is streamlined in the heaving vector.

Figure 3B:
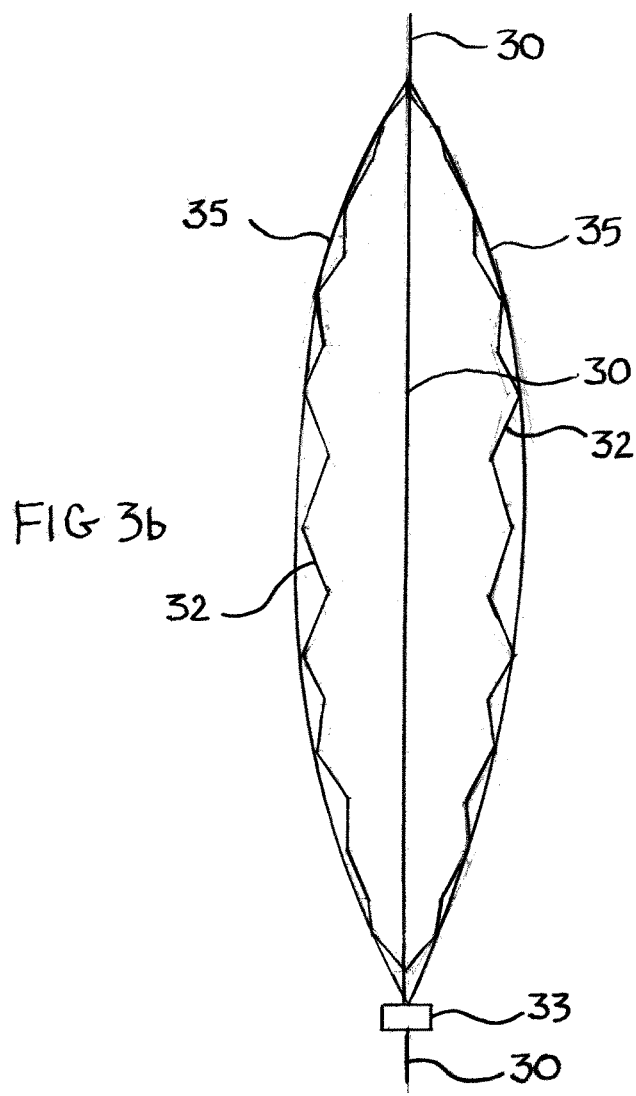
FIG. 3b: side view cross-section: 'puffer' heaving trap at high volume.

FIG. 3*b*: side view cross-section: 'puffer' heaving trap at high volume.

This figure is identical to FIG. 3*a*, except that the block (33) has been moved downwards. The pleats (32) in the vessel (31) have unfolded. The volume of water contained in the vessel (31) is high and the period of oscillation of the floating body is increased. The elastic outer skin (35) has stretched and the vessel (31) remains streamlined in the heaving vector.

Figure 4A:
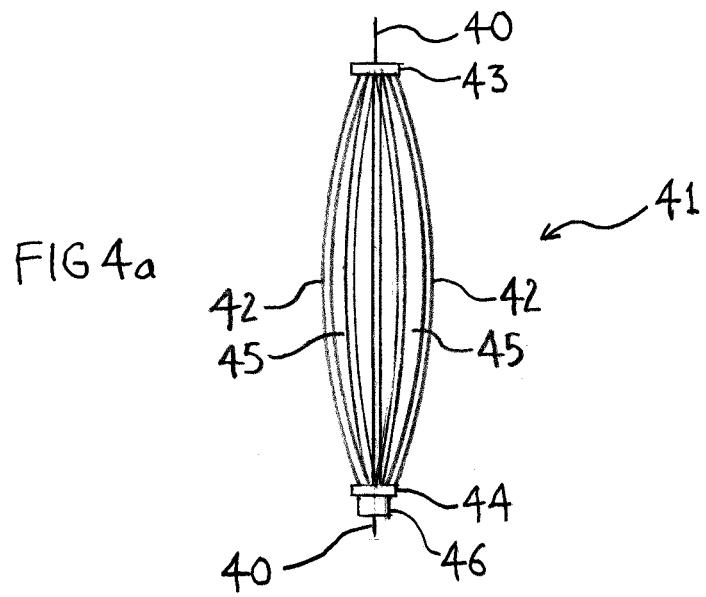
FIG. 4a: side view: 'rorqual' heaving trap at low volume.

FIG. 4*a*: side view: 'rorqual' heaving trap at low volume.

A heaving floating body (not shown) is rigidly attached at the underside to a rigid vertical spar (40) that passes through the axis of a vessel (41) having the shape of a vertical spindle. The vessel (41) comprises a vertical bundle of identical flexible strips (42) that are hinged at each end to an upper horizontal ring (43) and a lower horizontal ring (44). Adjacent strips (42) are connected by pleats of elastic material (45). The spar (40) is fixed to the top of the vessel (41) and is slidably attached to a lower block (46). The lower block (46) is fixed to the lower ring (44). Attached to the block (46) is a linear actuator (not shown) that can move the block (46) along the spar (40). A single port (detail not shown) at the bottom of the vessel allows water to enter and exit. By moving the block (46) downwards, the strips (42) are straightened, the pleats (45) are folded and the vessel (41) is compressed as shown. In the compressed state the volume of water contained in the vessel is low and the period of oscillation of the floating body is reduced. The vessel (41) is streamlined in the heaving vector. As an example, the strips are neoprene-coated high tensile steel and the elastic material is neoprene.

Figure 4B:
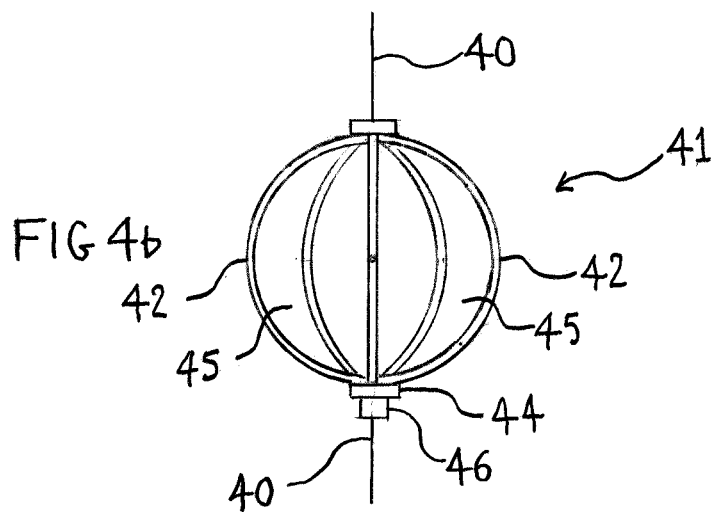
FIG. 4b: side view: 'rorqual' heaving trap at high volume.

FIG. 4*b*: side view: 'rorqual' heaving trap at high volume.

Figure 4C:
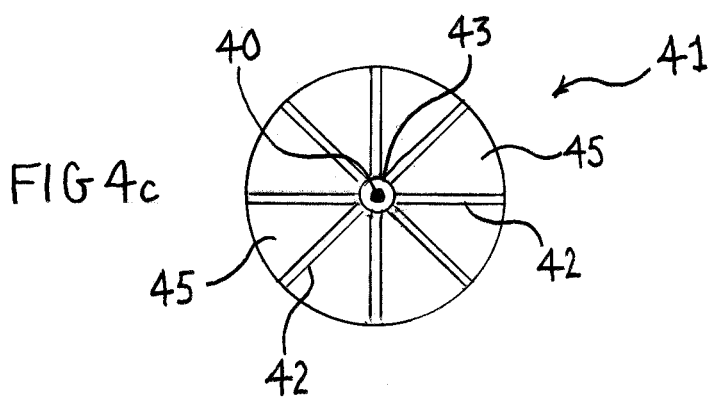
FIG. 4c: plan view: 'rorqual' heaving trap at high volume.

FIG. 4*c*: plan view: 'rorqual' heaving trap at high volume.

By moving the block (46) upwards, the strips (42) are flexed outwards, the pleats (45) are unfolded and the vessel (41) is expanded as shown. In the expanded state the volume of water contained in the vessel is high and the period of oscillation of the floating body is increased. The vessel (41) remains streamlined in the heaving vector.

Figure 5A:
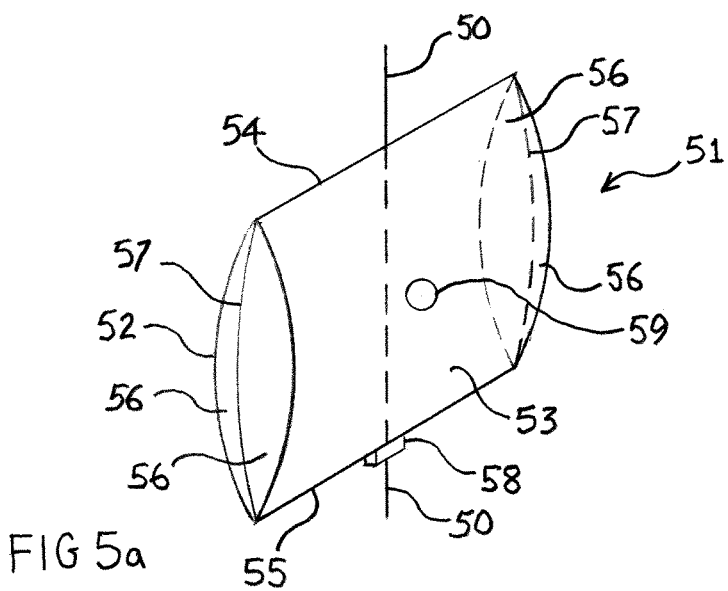
FIG. 5a: 3D view: bowing heaving trap at low volume.

FIG. 5*a*: 3D view: bowing heaving trap at low volume.

A heaving floating body (not shown) is rigidly attached at the underside to a rigid vertical spar (50) that passes through a bowing inertial trap (51). The bowing trap (51) comprises two flexible sheets (52, 53) made, for example, of a flexible composite such as fibre-glass embedded in epoxy resin. The sheets (52, 53) are joined by an elastic joint at the upper edge

(54) and at the lower edge (55) and are linked at each side by elastic material (56) stretched over a flexible rib (57) that is connected at each end to the upper and lower edges (54,55). The upper edge (54) of the flexible sheets (52, 53) is fixed to the spar (50) and the lower edge (55) is slidably attached to the spar (50). Attached to the lower edge (55) is a linear actuator (58) that grips the spar (50) and moves along it, pushing or pulling the flexible sheets (52, 53). The linear actuator (58) can be a geared, reversible electric motor driving friction wheels clamped to the spar (50). A single port (59) in the centre of one of the sheets (53) allows water to enter and exit. When the flexible sheets (52, 53) are pulled, the sheets (52, 53) and the ribs (57) straighten so that the volume between the sheets (52, 53) is low, as shown. As a result the period of oscillation of the floating body is reduced. The trap (51) presents a streamlined lenticular profile in the direction of heaving oscillation so that the trap does not create significant added mass or drag.

Figure 5B:
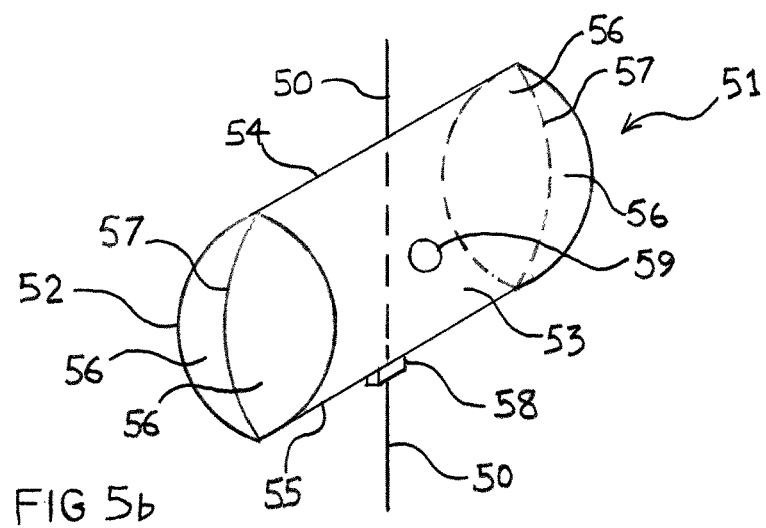
FIG. 5b: 3D view: bowing heaving trap at high volume.

FIG. 5b: 3D view: bowing heaving trap at high volume.

When the flexible sheets (52, 53) are pushed by the linear actuator (58), the sheets (52, 53) and the ribs (57) flex apart so that the volume between the sheets (52, 53) is high, as shown. As a result the period of oscillation of the floating body is increased. The trap (51) presents a streamlined lenticular profile in the direction of heaving oscillation so that the trap does not create significant added mass or drag.

Figure 5C:
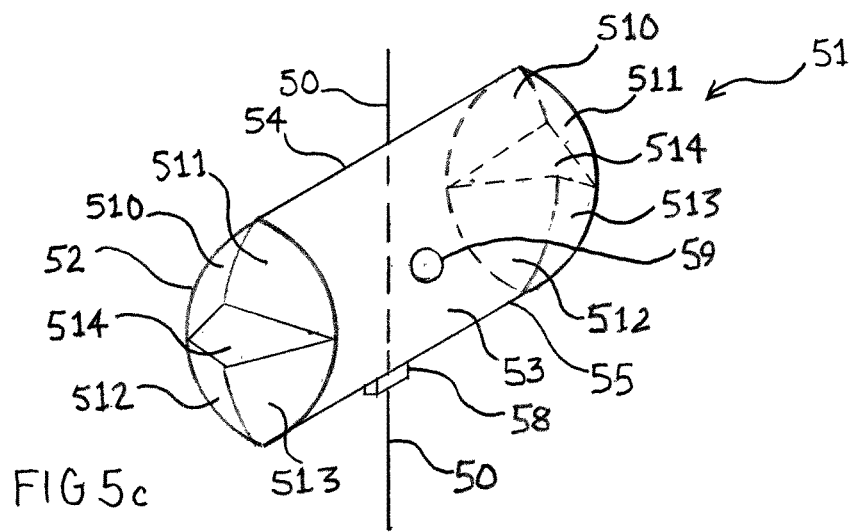
FIG. 5c: 3D view: bowing heaving trap with hinged side flaps.

FIG. 5c: 3D view: bowing heaving trap with hinged side flaps.

This trap is identical to the trap shown in FIGS. 5a, 5b, 5c except that the elastic material (56) and flexible ribs (57) are replaced by an arrangement of hinged flaps (510, 511, 512, 513). On each side of the flexible sheets (52, 53) are two upper flaps (510, 511) and two lower flaps (512, 513). The first upper flap (510) is hinged to the first flexible sheet (52) and also to the second upper flap (511), which is hinged to the second flexible sheet (53). The first lower flap (512) is hinged to the first flexible sheet (52) and also to the second lower flap (513), which is hinged to the second flexible sheet (53). The upper flaps (510, 511) overlap the lower flaps (512, 513) and are shaped so that as the sheets (52, 53) are flexed, the upper flaps (510, 511) slide over the lower flaps (512, 513). This sliding arrangement creates a central port (514). A low-friction seal (not shown) can be placed between the sliding surfaces of the flaps. The profile presented by the trap in the heaving vector is always streamlined.

Figure 6A:
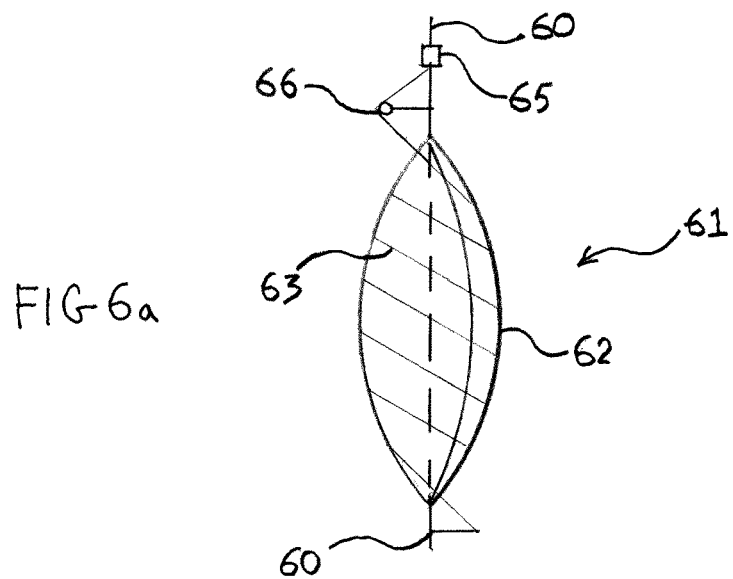
FIG. 6a: side view: lenticular scroll heaving trap at low volume.

FIG. 6a: side view: lenticular scroll heaving trap at low volume.

Figure 6B:
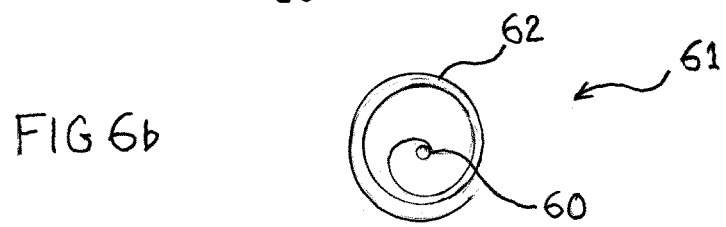
FIG. 6b: plan view cross-section: lenticular scroll heaving trap at low volume.

FIG. 6b: plan view cross-section: lenticular scroll heaving trap at low volume.

A heaving floating body (not shown) is rigidly attached at the underside to a rigid vertical spar (60) that passes through the axis of a scrolling inertial trap (61). The trap (61) comprises a sheet (62) of smooth, springy, flexible material that is fixed along one vertical side to the spar (60) and is scrolled round the spar (60) and held in position by means of an external flexible spiral harness (63) that slides freely across the outer surface of the sheet. The sheet (62) is curved at top and bottom so that the scrolled sheet (62) forms a vertical spindle shape with a port (64) at the bottom that allows water to enter and exit. The harness (63) is fixed at the bottom to the spar (60) and at the top runs over a pulley (66) to a locking winch (65) that is fixed to the spar (60).

When the winch (65) shortens the harness (63), the scroll reduces in diameter, the contained volume of water is low, as shown, and the period of oscillation of the floating body is reduced.

The trap (61) presents a streamlined lenticular profile in the direction of heaving oscillation so that the trap does not create significant added mass or drag.

Figure 6C:
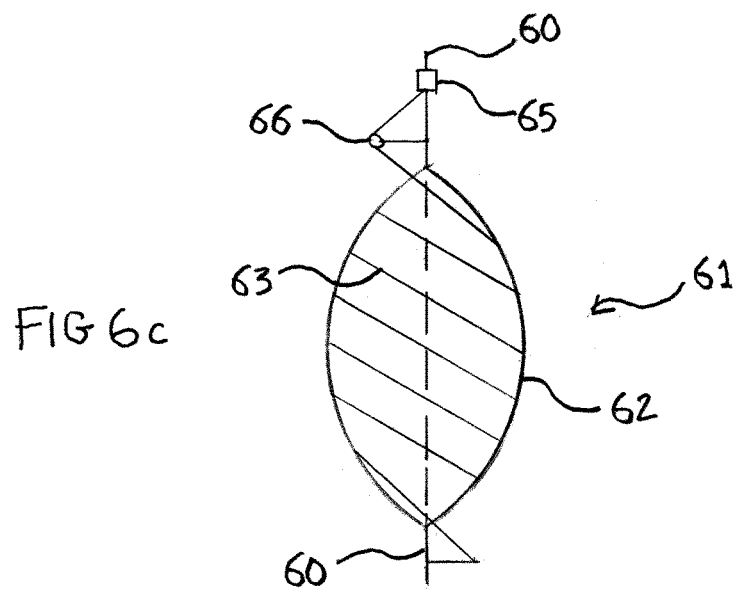
FIG. 6c: side view: lenticular scroll heaving trap at high volume.

FIG. 6c: side view: lenticular scroll heaving trap at high volume.

Figure 6D:
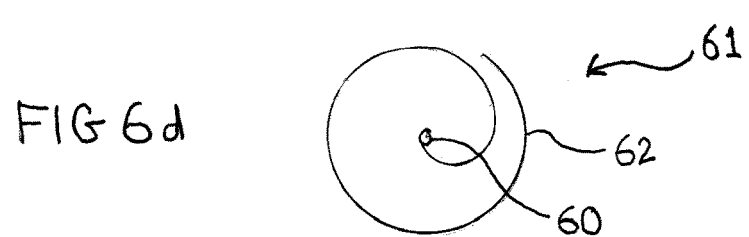
FIG. 6d: plan view cross-section: lenticular scroll heaving trap at high volume.

FIG. 6d: plan view cross-section: lenticular scroll heaving trap at high volume.

When the winch (64) lengthens the harness (63), the scroll increases in diameter, the contained volume of water is high, as shown and the period of oscillation of the floating body is increased.

Figure 7A:
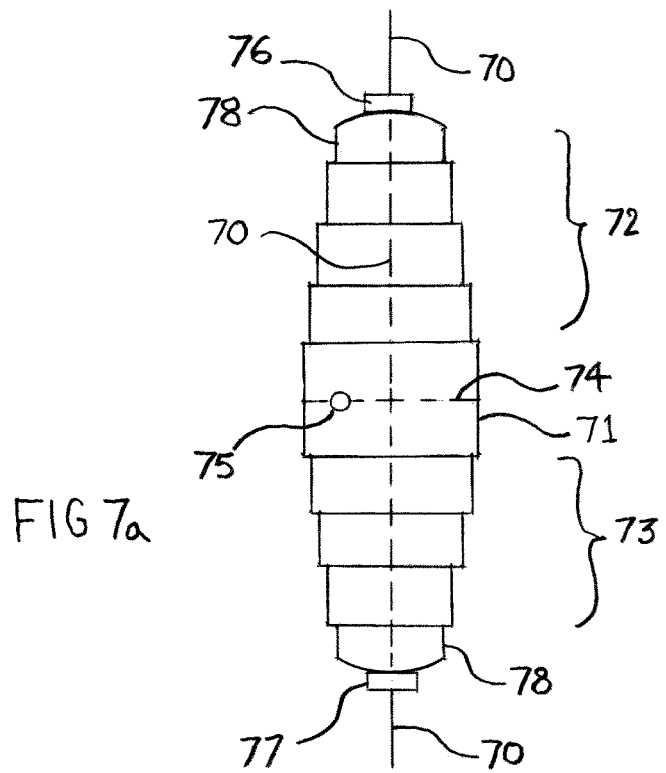
FIG. 7a: side view: telescoping cylinder heaving trap.

FIG. 7a: side view: telescoping cylinder heaving trap.

A rigid vertical spar (70) is rigidly attached to the underside of a heaving floating body (not shown) and passes through the vertical axis of a variable capacity inertial trap that comprises a vertical rigid central cylindrical section (71) with an upper series of rigid cylindrical sections (72) that telescope into the central section (71) and a lower series of rigid cylindrical sections (73) that telescope into the central section (71). A rigid cross-bar (74) is fixed at right angles to the spar (70) and the ends of the cross-bar (74) are rigidly fixed to the wall of the central section (71). Ports (75) in the wall of the central section (71) allow water in and out of the trap. An upper block (76) is slidably attached to the spar (73) and is attached to the face of the smallest of the upper sections (71). A lower block (77) is slidably attached to the spar (73) and is attached to the face of the smallest of the lower sections (72). The blocks (76, 77) are fixed to linear actuators (not shown) that can move the blocks (76, 77) along the spar (73).

When the blocks (76, 77) are moved apart, the telescoping sections (71, 72) extend, the volume of water contained in the trap increases and the period of oscillation of the heaving floating body increases. When the blocks (76, 77) are moved together, the telescoping sections nest together, the volume of water contained in the trap decreases and the period of oscillation of the heaving floating body falls. By using streamlined caps (78) to terminate the smallest sections, the trap remains reasonably streamlined at all volumes, avoiding added mass and drag.

Figure 7B:
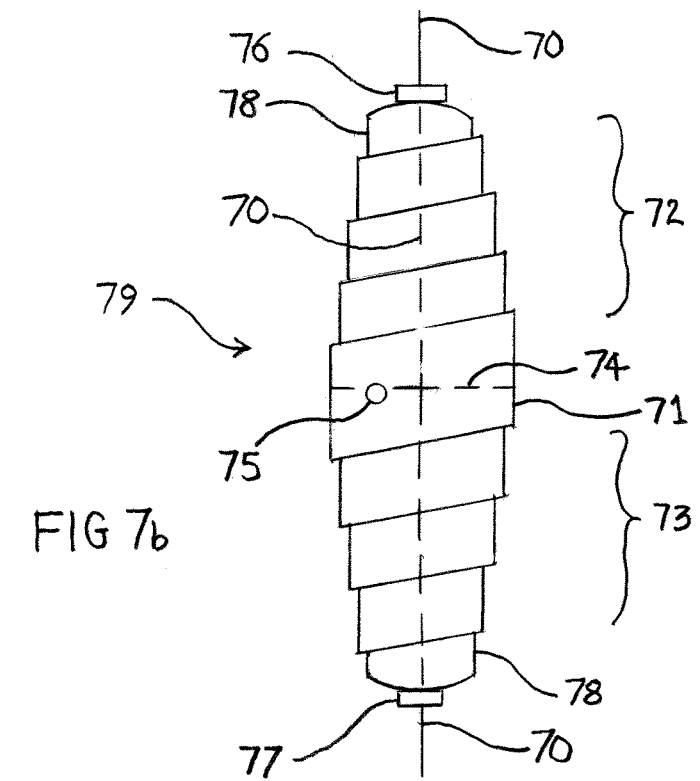
FIG. 7b: side view: telescoping spiral heaving trap.

FIG. 7b: side view: telescoping spiral heaving trap.

The telescoping sections of FIG. 7a can be substituted by a continuous resilient spiral strip (79) as shown.

Figure 8A:
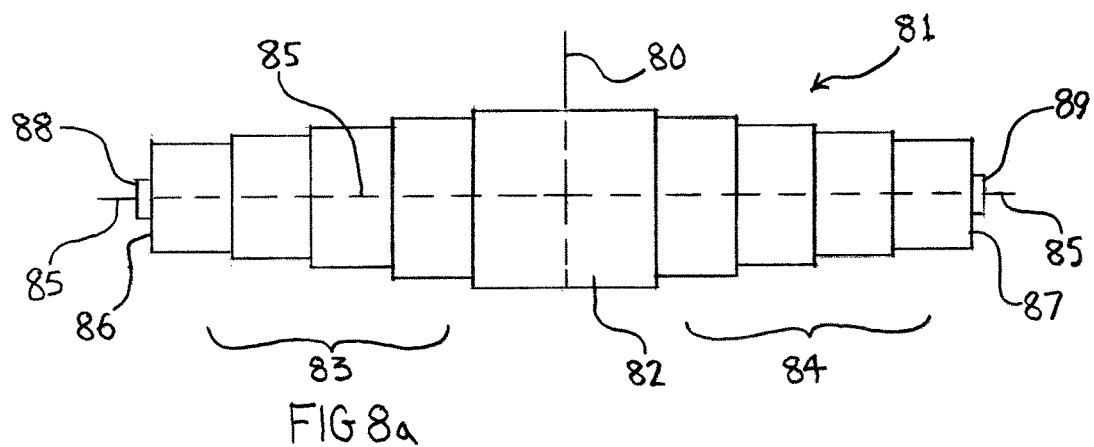
FIG. 8a: side view: bilaterally symmetrical telescoping heaving trap.

FIG. 8a: side view: bilaterally symmetrical telescoping heaving trap.

Figure 8B:
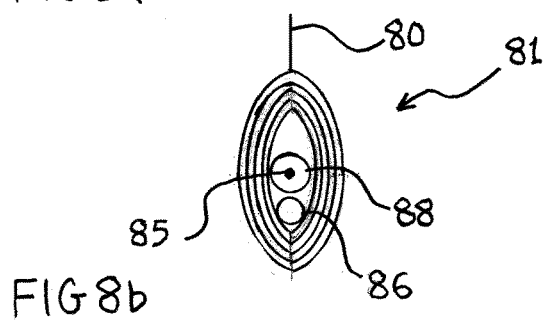
FIG. 8b: second side view: bilaterally symmetrical telescoping heaving trap.

FIG. 8b: second side view: bilaterally symmetrical telescoping heaving trap.

A heaving floating body (not shown) is rigidly attached at the underside to a rigid vertical spar (80) that passes through the centre of a vessel (81). The vessel (81) comprises a central section (82), a first set of horizontally telescoping sections (83) and a second set of horizontally telescoping sections (84). The central section (82) is rigidly attached at top and bottom to the spar (80). All the sections (82, 83, 84) are streamlined in the heaving vector and preferably lenticular. A rigid cross-bar (85) is fixed rigidly to the spar (80) and is at right angles to it. One arm of the cross-bar (85) passes through the centre of the smallest of the first set of sections (83), adjacent to a port (86) and the other arm of the cross-bar (85) passes through the centre of the smallest of the second set of sections (84), adjacent to a port (87). A first block (88) is slidably attached to one arm of the cross-bar (85) and a second block (89) is slidably attached to the other arm of the cross-bar (85). The first block (88) is rigidly attached to the smallest section of the first set of telescoping sections (83). The second block (89) is rigidly attached to the smallest section of the second set of telescoping sections (84). The blocks (88, 89) are each moved by linear actuators (not shown). As the blocks (88, 89) move towards each other, the outer sections (83, 84) telescope into the central section (82): the volume of water contained in the vessel (81) is reduced and as a result the oscillating period of the floating body is reduced. This effect is reversed when the blocks (88, 89) move apart. The vessel (81) remains streamlined at all volumes so that the added mass and drag are both small.

Figure 9A:
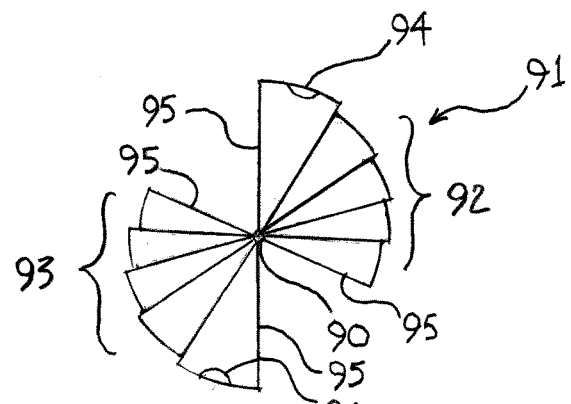
FIG. 9a: plan view: rotating telescoping heaving trap.

FIG. 9a: plan view: rotating telescoping heaving trap.

Figure 9B:
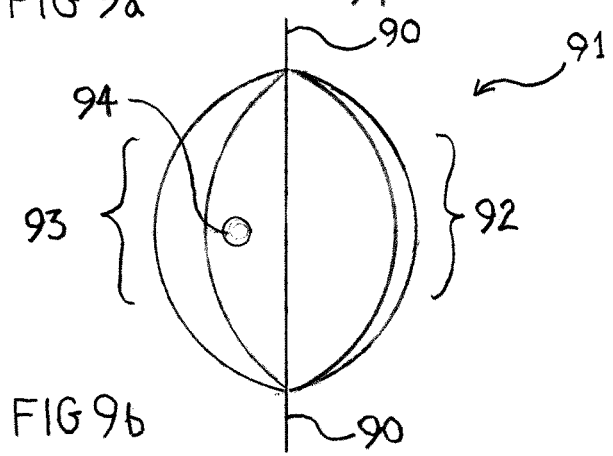
FIG. 9b: side view: rotating telescoping heaving trap.

FIG. 9b: side view: rotating telescoping heaving trap.

A heaving floating body (not shown) is rigidly attached at the underside to a rigid vertical spar (90) that passes through the centre of a vessel (91). Fixed rotatably on the spar (90) is a first series of telescoping sections (92) with a vertical profile that is lenticular. These sections (92) telescope by rotation round the spar (90). Fixed rotatably on the spar (90) is a second series of telescoping sections (93) with a vertical profile that is lenticular. The second series (93) is symmetrical with the first series (92) and also telescopes by rotation in the same angular direction. A port (94) in the middle of the largest section of each series (92, 93) enables water to enter and leave the vessel (91). An actuator (not shown) attached to the spar (90) rotates each series (92, 93). The end faces (95) of each series (92,93) are sealed. When the sections (92, 93) are telescoped together, the volume contained in the vessel (91) is a minimum; when the sections (92, 93) are extended, the volume contained in the vessel (91) increases. By varying the volume of water in the vessel (91), the period of oscillation of the heaving floating body (not shown) is varied. The vessel (91) remains streamlined at all volumes so that the added mass and drag are both small.

Figure 10:
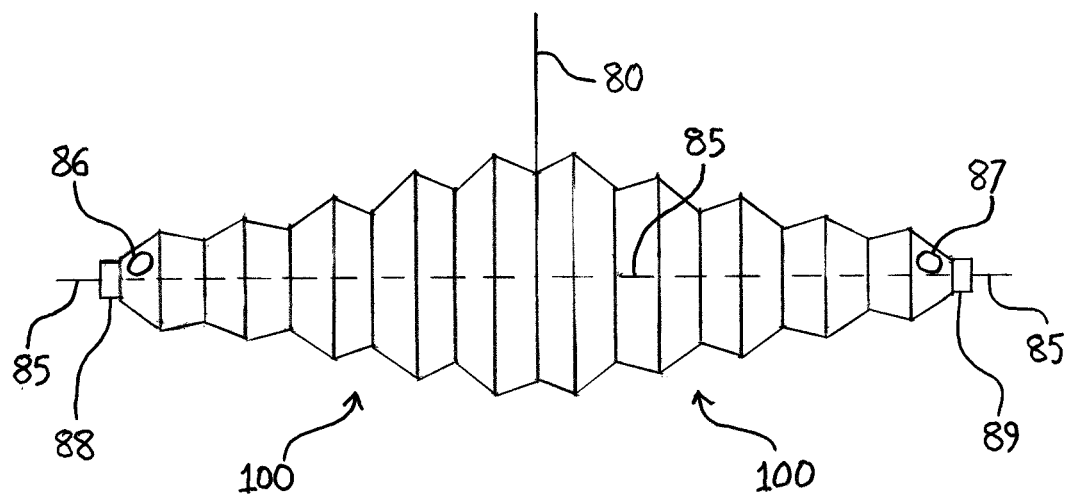
FIG. 10: side view: nested lenticular pleat heaving trap.

FIG. 10: side view: nested lenticular pleat heaving trap.

The telescoping variable capacity trap described in FIGS. 8a, 8b can be constructed with nesting pleats (100) replacing the telescoping sections.

Figure 11:
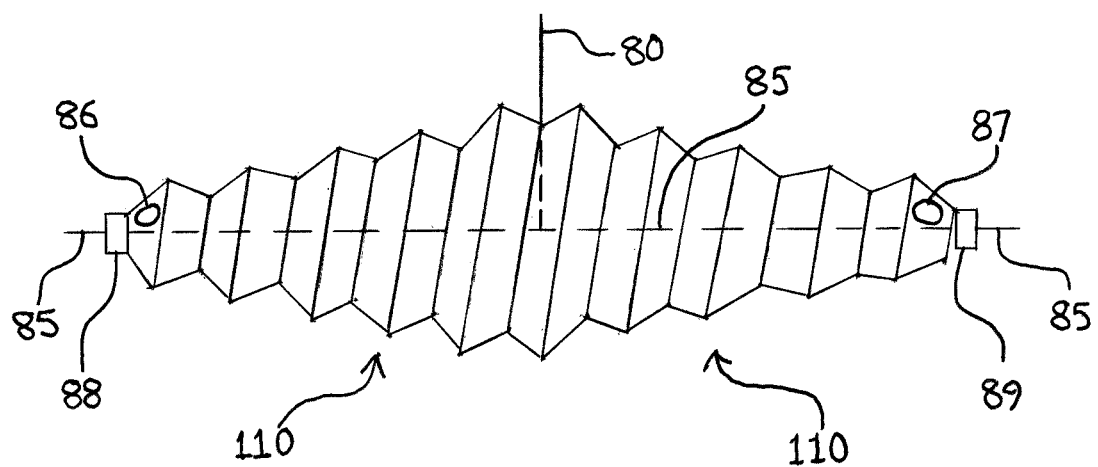
FIG. 11: side view: spirally reinforced pleated heaving trap.

FIG. 11: side view: spirally reinforced pleated heaving trap.

The nesting pleat heaving trap described in FIG. 10 can be constructed with spiral pleats (110) reinforced by a springy spiral wire replacing the unreinforced pleats (100). The wire provides rigidity to the trap and provides a returning force after compression.

Figure 12A:
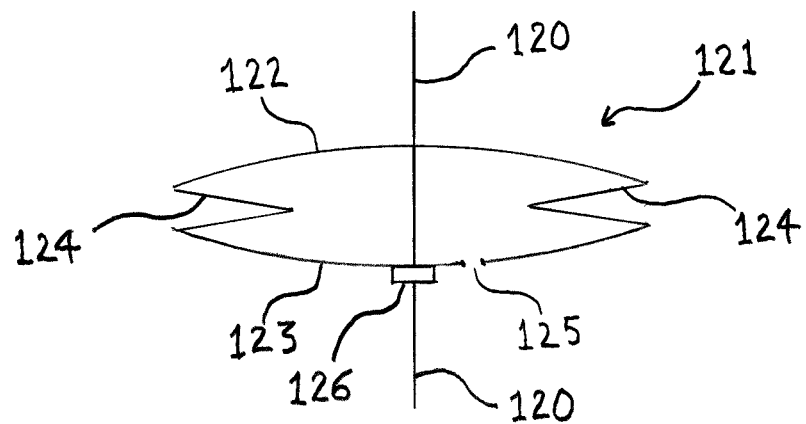
FIG. 12a: side view cross-section: annular pleat surging trap.

FIG. 12a: side view cross-section: annular pleat surging trap.

Figure 12B:
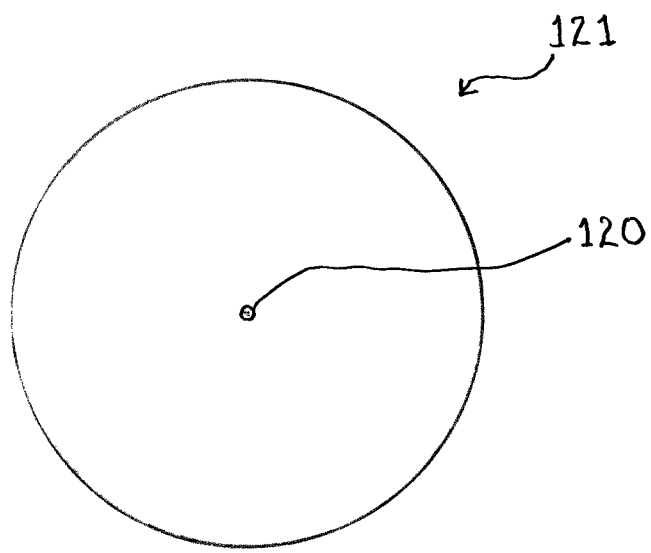
FIG. 12b: plan view: annular pleat surging trap.

FIG. 12b: plan view: annular pleat surging trap.

A surging floating body (not shown) is rigidly attached at the underside to a rigid vertical spar (120) that passes through the centre of a vessel (121). The vessel (121) is disc-shaped, presenting a lenticular cross-section in every horizontal vector, so that surging oscillation can be omnidirectional. The upper and lower faces (122, 123) of the vessel are circular plates that are joined by one or more flexible annular pleats (124). Ports (125) in the circular faces (122, 123) allow water to enter or leave the vessel.

The spar (120) is fixed to the upper face (122). A block (126) is slidably attached to the spar (120) and also fixed to the lower face (123). When the block (126) is moved upwards, the volume of water in the vessel (121) is reduced. When the block (126) is moved downward, the volume of water in the vessel (121) is increased. The block (126) is moved by a linear actuator (not shown). By increasing or reducing the volume of water in the trap, the oscillation period of the surging body (not shown) is increased or reduced respectively. At all times the trap is streamlined in the vector of oscillation.

Figure 13:
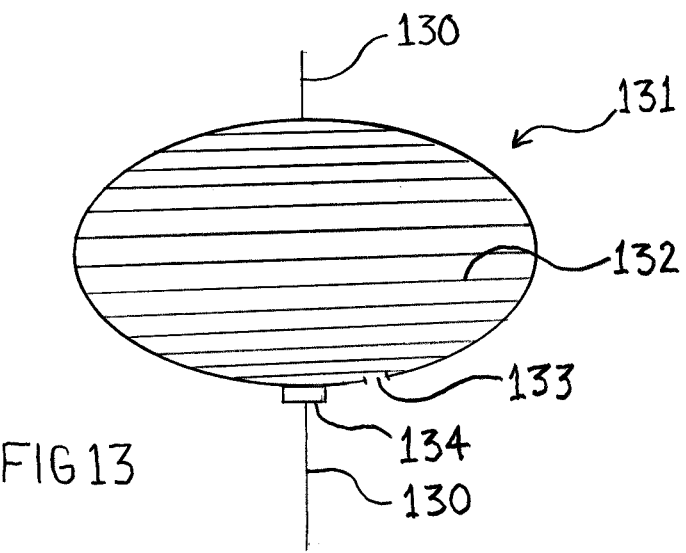
FIG. 13: side view: spiral reinforced balloon surging trap.

FIG. 13: side view: spiral reinforced balloon surging trap.

A surging floating body (not shown) is rigidly attached at the underside to a rigid vertical spar (130) that passes through the centre of a vessel (131). The vessel (131) is made of elastic material, stretched over an embedded spherical spiral of high tensile wire (132). A port (133) in the elastic material allow water to enter and leave the vessel (131). The vessel (131) presents a streamlined cross-section in every horizontal vector, so that surging oscillation can be omnidirectional. The spar (130) is fixed to the top of the spiral (132). A block (134) is slidably attached to the spar (130) and fixed to the bottom of the spiral (132). The block (134) is attached to a linear actuator (not shown) that can move the block (134) along the spar (130). When the block (134) is moved upwards, the spiral is compressed, the vessel (131) becomes a flattened ovoid and the volume of water in the vessel (131) is reduced. By increasing or reducing the volume of water in the trap, the oscillation period of the surging body (not shown) is increased or reduced respectively. At all times the trap is streamlined in the vector of oscillation.

Figure 14A:
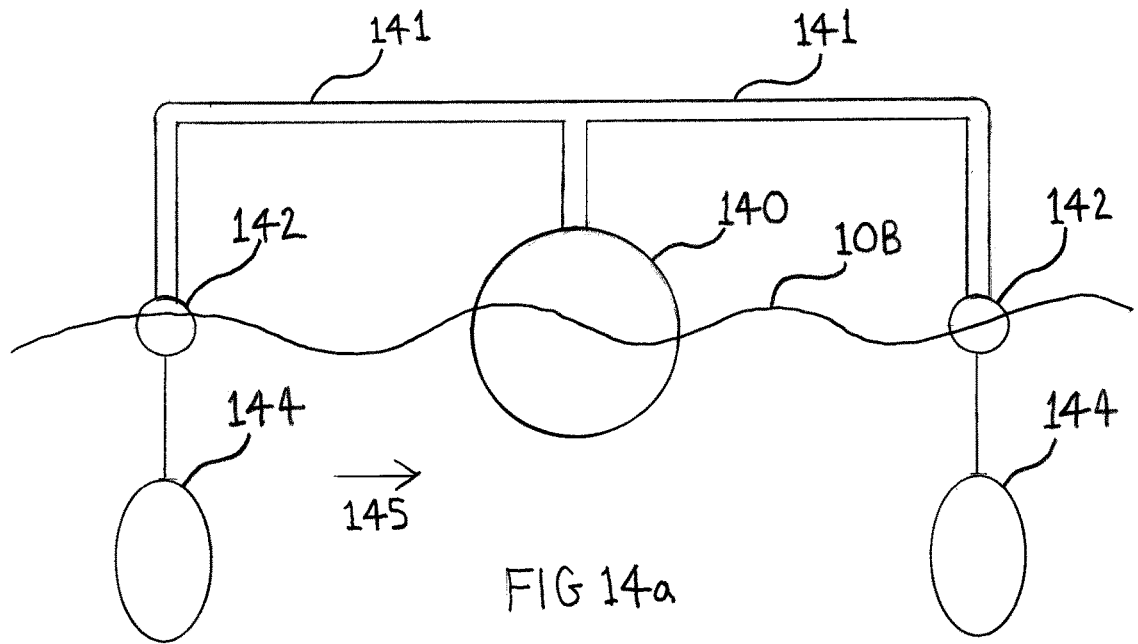
FIG. 14a: side view: pitching WEC with inertial traps.

FIG. 14a: side view: pitching WEC with inertial traps.

A pitching WEC comprises a central floating body (140) with a circular cross-section in the pitching plane, and rigidly attached to this body, two light-weight elevated arms (141) fore and aft. Rigidly attached to the end of each arm (141), is a floating buoyant body (142) rigidly attached by a rigid spar (143) to a submerged, streamlined variable capacity inertial trap (144). By filling and emptying the inertial traps (144) symmetrically, the period of pitching can be varied. The WEC is aligned with the dominant swell (10B: direction shown by arrow (145)) by means of slack tethers (not shown) that connect the floating body (140) to the seabed (not shown). As an example, power can be taken off by capturing the differential motion of the central floating body (140) and an internal mass (not shown). Because the central floating body (140) is circular in the pitching plane, because the arms are out of the water and because the inertial traps are streamlined, fixed added mass moment of inertia is small, so enabling wide range dynamic tuning.

Figure 14B:
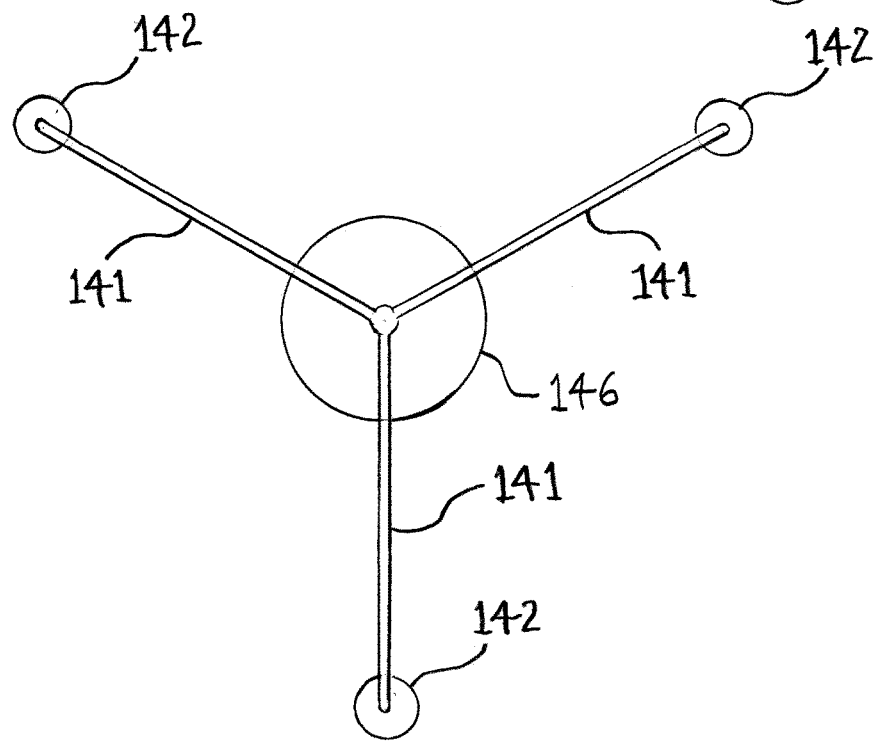
FIG. 14b: plan view: omnidirectional pitching WEC with inertial traps.

FIG. 14b: plan view: omnidirectional pitching WEC with inertial traps.

A pitching WEC can be made omnidirectional by arranging at least three elevated arms (141) at equal radial angles fixed to a floating spherical body (146). Each arm carries a floating body (142) and, rigidly attached to each floating body is a submerged, streamlined variable capacity inertial trap (144).

Figure 15:
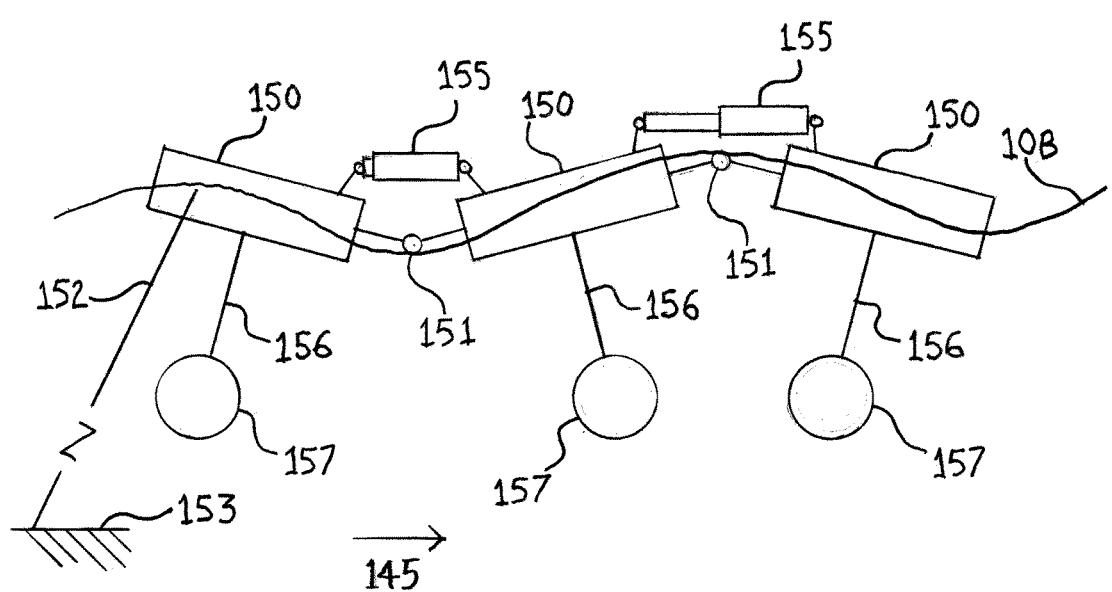
FIG. 15: side view: hinged wave following WEC with inertial traps.

FIG. 15: side view: hinged wave following WEC with inertial traps.

A plurality (three are shown) of streamlined floating bodies (150) is linked in series by hinges (151), shown here as ball and socket joints that permit angular motion in any direction. The series of floating bodies (150) is oriented to the dominant swell by means of slack tethers (152) that are fixed to the first in the series of floating bodies (150) and to the seabed (153). The direction of the dominant swell (10B) is indicated by an arrow (145). Differential motion of adjacent floating bodies (150) is captured by encased pistons (155). Three or more encased pistons (155) are arranged symmetrically between each pair of adjacent bodies (150). For simplicity, only one encased piston (155) is shown between adjacent bodies (150). The pistons (155) drive fluid through a rotary engine (not shown) that drives a rotary electrical generator (not shown). Each floating body (150) is attached by means of a rigid spar (156) to a submerged, streamlined, variable capacity inertial trap (157). By varying the volume of water in the traps (157), the oscillation of the floating bodies (150) can be dynamically tuned to match the period of the dominant swell. The floating bodies (150) are of light-weight construction to avoid high levels of fixed mass that would make wide-range tuning impossible. The floating bodies (150) also have streamlined V-shaped hulls (not shown) to avoid significant levels of fixed added mass that would also make wide-range tuning impossible. By controlling valves (not shown) in the fluid circuit (not shown), the stiffness of linkages between adjacent floating bodies (150) can be controlled. This enables control of the effective length of the WEC or its constituent sections, matching the half wavelength of the dominant swell and so improving resonant energy transfer.

The invention claimed is:

1. A means of dynamically varying the natural unforced oscillation period of an oscillating body wave energy converter that is situated in a body of oceanic water, for dynamic tuning of said wave energy converter to achieve resonance with ocean swell;

said wave energy converter being arranged to extract power in at least one oscillation vector selected from heaving, surging, pitching, and said wave energy converter comprising:

a buoyant body that is arranged to oscillate under the influence of ocean swell, wherein said swell has oscillation periods characteristic of energetic ocean swell, in the range from 5 seconds to 25 seconds;

said body being rigidly attached by a rigid element to a hollow vessel wholly submerged in said body of water;

said submerged vessel being arranged to trap and release water;

said submerged vessel having walls with a geometry that can be dynamically and controllably varied by means of at least one powered linear actuator and only by said actuator or actuators, whereby said trapped water can be dynamically and controllably varied, whereby the inertial mass of said vessel can be dynamically and controllably varied and thereby the oscillation period of said buoyant body can be dynamically and controllably varied so that said natural oscillation period can be dynamically controlled to a determinate level;

said submerged vessel having at least one channel connecting interior of said vessel to a part of said body of water that surrounds and is directly adjacent to exterior of said submerged vessel;

said at least one channel not requiring inclusion of one-way valves and being without substantial obstruction or restriction, and not being connected to a power take off system during said variation in said geometry, so allowing water to move freely both in and out of said submerged vessel during said variation in said geometry;

said submerged vessel thereby enclosing a volume of water that is at ambient or close to ambient pressure during said variation in said geometry;

there being said at least one channel open at the top of said submerged vessel during said variation in said geometry to fill said submerged vessel with water during said variation in said geometry;

no part of said submerged vessel being held at a fixed distance from an adjacent sea-bed, whereby said submerged vessel in its entirety moves identically with said buoyant body and thereby substantially all of said enclosed volume of water, being trapped, moves identically with said buoyant body, whereby the inertial mass of said enclosed volume of water adds to the effective mass moment of inertia of said buoyant body;

said submerged vessel in its entirety is rigidly attached to, and moves identically with, said buoyant body, wherein said geometry is substantially unaffected by wave height;

wherein said at least one powered linear actuator being attached to, and reacting against said rigid element, and also being attached to said walls of said submerged vessel;

said at least one powered linear actuator is controllable with respect to extension of length, speed and force;

said submerged vessel being always substantially streamlined in direction of said at least one oscillation vector during said variation in said geometry.

2. A means of dynamic tuning as claimed in claim 1 wherein said vessel is always substantially streamlined in the direction of said oscillation.

3. A means of dynamically varying the natural unforced oscillation period of an oscillating body wave energy converter as claimed in claim 1 wherein said submerged vessel comprises at least one elastic element.

4. A means of dynamically varying the natural unforced oscillation period of an oscillating body wave energy converter as claimed in claim 1 wherein said submerged vessel comprises at least one flexing element.

5. A means of dynamically varying the natural unforced oscillation period of an oscillating body wave energy converter as claimed in claim 1 wherein said submerged vessel comprises at least one sliding element.

6. A means of dynamically varying the natural unforced oscillation period of an oscillating body wave energy converter as claimed in claim 1 wherein said submerged vessel comprises at least one pleated element.

7. A means of dynamically varying the natural unforced oscillation period of an oscillating body wave energy converter as claimed in claim 1 wherein said submerged vessel is opened and closed using flex-frames.

8. A means of dynamically varying the natural unforced oscillation period of an oscillating body wave energy converter as claimed in claim 1 wherein said body is one of a series of adjacent linked floating bodies arranged so that power can be extracted from the relative motion of said floating bodies.

* * * * *